United States Patent [19]
Diehl

[11] 4,079,423
[45] Mar. 14, 1978

[54] SOLID STATE IMAGING SYSTEM PROVIDING PATTERN NOISE CANCELLATION

[75] Inventor: Max H. Diehl, Chittenango, N.Y.

[73] Assignee: General Electric Company, Syracuse, N.Y.

[21] Appl. No.: 732,470

[22] Filed: Oct. 14, 1976

[51] Int. Cl.² .............................................. H04N 5/30
[52] U.S. Cl. ..................................... 358/213; 358/167
[58] Field of Search ....................... 358/212, 213, 167; 250/211 J, 211 R, 578

[56] References Cited

U.S. PATENT DOCUMENTS 3,949,162   4/1976   Malueg ............................ 358/213 X Primary Examiner—Robert L. Richardson
Attorney, Agent, or Firm—Richard V. Lang; Carl W. Baker; Frank L. Neuhauser

[57] ABSTRACT

The present invention relates to a solid state imaging system in which pattern noise is cancelled both electrically and visually. Pattern noise takes the form of a succession of variable amplitude pulses occurring as each light sensing element in a row of elements is read out. The pattern noise is duplicated from row to row. Since pattern noise is initially many times larger than the video signal, it must be reduced to a fraction of the video signal for satisfactory imager operation. In accordance with the invention, a first video signal is formed in which each row of sensors is first scanned with video and pattern noise present followed by a second scanning with video absent and pattern noise present. The first video signal, delayed one horizontal line, is then combined subtractively with an undelayed first video signal to form a second video signal in which the video information in the first member of the line pair is of one polarity and of opposite polarity in the second member while the pattern noise is cancelled to a small residue of like polarity in both members of the line pair. A third video signal is formed with the video in each line pair of like polarity and the pattern noise residues of opposite polarity. The third video signal is now in a form suitable for visual cancellation of the pattern noise residues. This is accomplished by causing the third video signal to be displayed with the pattern noise of one polarity on odd lines of the monitor and of opposite polarity on even lines of the monitor.

4 Claims, 5 Drawing Figures

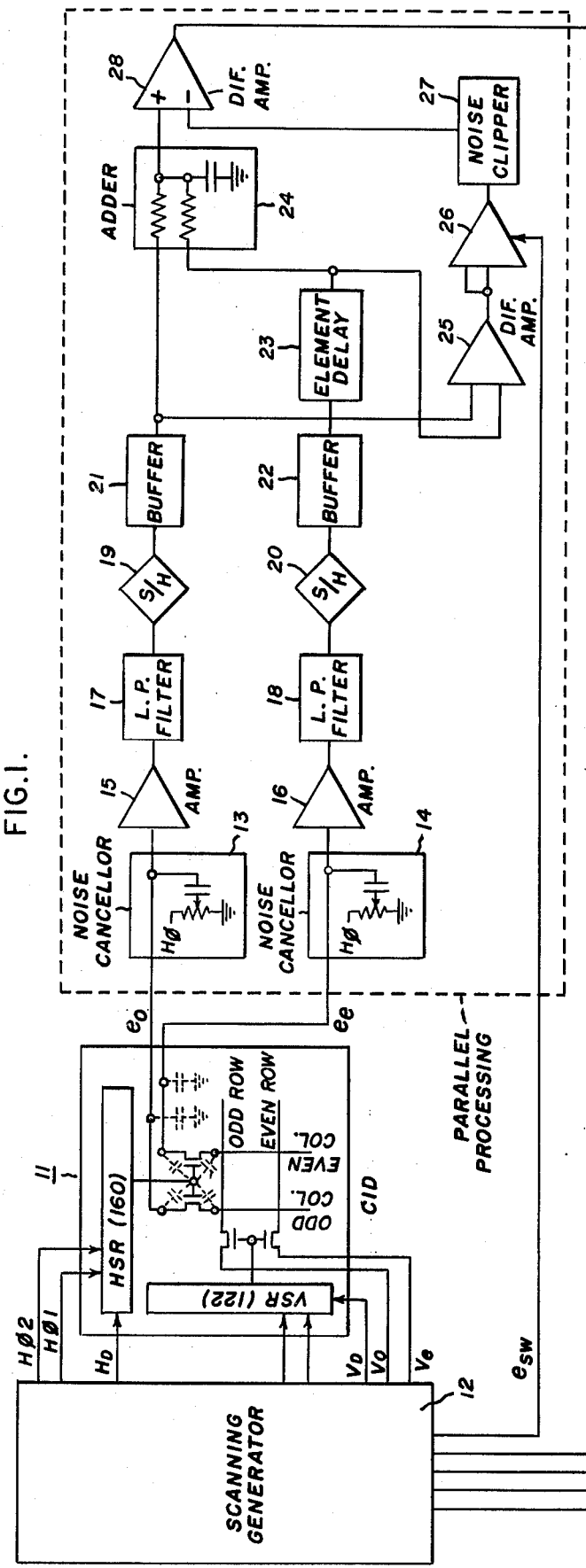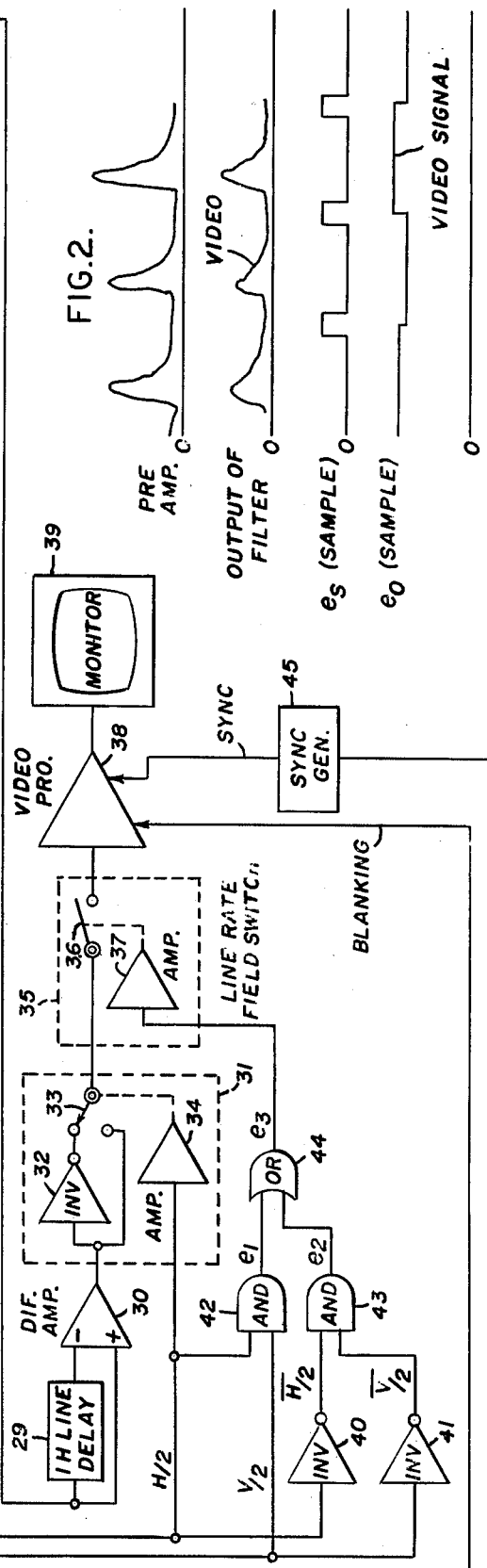

SOLID STATE IMAGING SYSTEM PROVIDING PATTERN NOISE CANCELLATION

BACKGROUND OF THE INVENTION

1. Field of the Invention

The present invention relates to solid state imaging systems and more particularly to the suppression of pattern noise in solid state imaging systems.

2. Description of the Prior Art

Solid state imagers, including both charge injection devices and charge coupled devices, consist of arrays of sensors in which rows and columns are activated in a regular manner by two separate series of pulses which scan the array. The horizontal scanning is done by a pulse which is stepped by a horizontal shift register along each sensor element in the row. This pulse creates a transient, which is the principal source of pattern noise. During the time period allocated for reading out the video signal stored on an element, the transient decays. When a long period can be allocated to the readout of each element, the video signal can be sampled late enough to allow a substantial decay in the transient and the derivation of a relatively noise free signal. As arrays have achieved higher resolution, however, the time allocated for reading each element has diminished, and other techniques to reduce the pattern noise have become necessary.

It has been recognized that the pattern noise is duplicated as row after row of sensors is read out, the pattern noise being primarily a function of parasitic capacities in the individual stages of the horizontal shift registers and in the enabling gates associated with each column of sensors. In other words, the pattern noise transients formed in all sensor elements tied to the same stage of the horizontal shift register and to the same horizontal enabling gates are substantially identical. At the same time, there is a substantial variation in the pattern noise transients from element to element in the same horizontal row of sensors.

Several techniques, in addition to delayed sampling, have been proposed to reduce the pattern noise. Since the pulses have an average dc content, it is known to add a fixed sample of the horizontal switching pulse in opposite polarity and suitable magnitude to effect a first reduction in the average amount of pattern noise. It is also known to filter out high frequency components of the transient. These techniques lead to a signal to noise ratio on the order of 10 or 20 to 1. Better signal to noise ratios are desirable.

SUMMARY OF THE INVENTION

Accordingly, it is an object of the present invention to provide an improved solid state imaging system.

It is a further object of the present invention to provide a solid state imaging system in which pattern noise is reduced.

It is another object of the invention to provide a solid state imaging system using a charge injection device as the imager in which pattern noise is reduced.

These and other objects of the invention are achieved in a novel combination including a solid state imager, delay means and combining means. The solid state imager is one in which pattern noise is present in the video output in the form of a succession of variable amplitude pulses, which occur once for each light sensing element in each row and which are duplicated from row to row. The imager is arranged to generate a video signal in which a row storing video information is read out destructively at a given horizontal line rate followed by readout of the same row at the given horizontal line rate before video information has been re-established. In the process, a first video signal is formed in which each line of video information containing pattern noise is followed by a line containing no video and repeating the pattern noise. The imager output is coupled to the delay means for delaying the first video signal by one horizontal line interval. The undelayed and delayed first video signals are then combined in the combining means in opposite polarities to form a second video signal in which the video information occurs in a line pair, the video information of the first line of the pair being repeated in opposite polarity in the second line, and the pattern noise being reduced by cancellation to a small residue of like polarity in both lines of each line pair (after the first line pair).

In accordance with a further aspect of the invention, the odd sensor rows are read out in consecutive order to form a first field, and the even sensor rows are read out in consecutive order to form a second field. In addition, switching means are provided to which the second video signal is applied. The switching means inverts one line of each line pair to form a third video signal in which the pattern noise residue of the first line is of opposite polarity to that of the second line while the video information is of like polarity. Further switching means are provided to select the first members of each line pair from one sensor field in consecutive order to form a first display field and to select the second members of each line pair from the second sensor field in consecutive order to form a second display field. In this manner, a fourth video signal is formed in which the polarity of the pattern noise residue in the first display field opposes that in the second display field so as to provide visual cancellation.

In accordance with a further aspect of the invention, a synchronizing pulse generator is provided for adding horizontal synchronizing pulses to the fourth video signal to facilitate display of an integral number of lines per field with the odd sensor rows being displayed in alternation with and equally spaced between the even sensor rows. Preferably, the synchronizing pulse generator produces horizontal pulses twice per line, these pulses starting both odd and even sensor fields at the beginning of the line. The "sync" pulses cause the display monitor to sweep once with a video signal and once without a video signal (respectively) per line pair for one field, and once without a video signal and once with a video signal (respectively) per line pair for the alternate field.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings, in which:

FIG. 1 is a block diagram of a solid stage imaging system using a CID imager whose output is available on a pair of output terminals and processed in parallel for an initial reduction in pattern noise. The video outputs are combined and processed in accordance with the invention to provide line to line electrical and field to field visual pattern noise cancellation;

FIG. 2 illustrates the pattern noise waveforms during the initial parallel processing;

DESCRIPTION OF PREFERRED EMBODIMENTS

Figure 3:
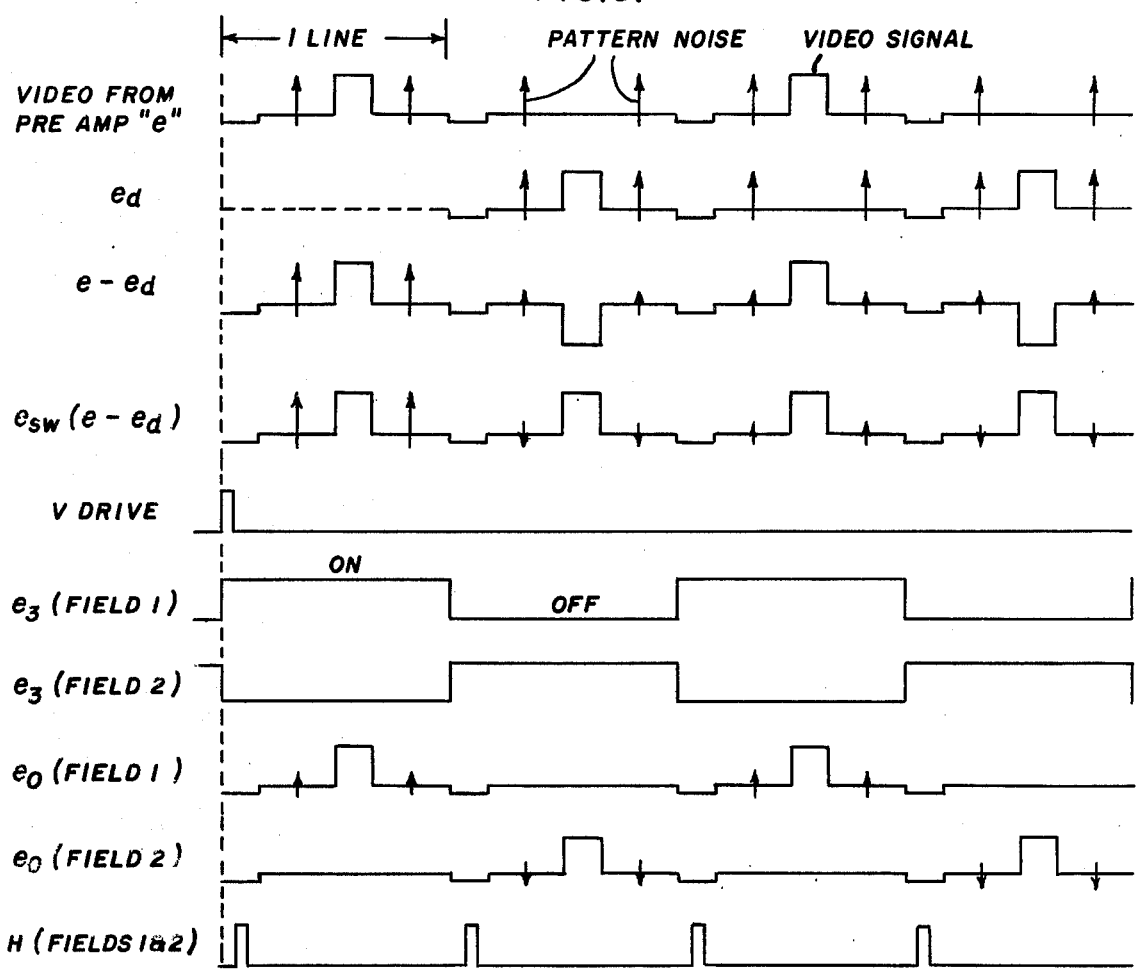
FIG. 3 illustrates waveforms relevant to line to line electrical and field to field visual pattern noise cancellation, graphed at the horizontal line rate.

Referring now to FIG. 1, a block diagram of a solid state imaging system is shown. The input block of the system is a CID (charge injection device) imager 11, upon which an image is focused. The imager 11 is coupled to a scanning generator 12, which controls the conversion of the image formation on the sensor array into a pair of time variant electrical signals, available at two output terminals. Following the imager are the blocks 13 through 28, which are known, and which operate upon the output signals from the imager to reduce the pattern noise to 1/10th to 1/20th the level of the video signal. In the process, the ratio of the random noise to the signal is also reduced. The known noise reduction circuit is followed by a further pattern noise reduction network incorporating the invention. The novel pattern noise reduction network involves the blocks 29 through 37 with some modification of other parts of the system. At the output of the system, the signal to noise ratio is typically 400 to 1. The final element in the FIG. 1 system is the monitor 38 for displaying the signal. A conventional monitor is used.

The CID imager 11 includes vertical and horizontal shift registers and vertical and horizontal enable gates which assist in scanning the image focused on the sensor array. In a typical arrangement, the imager consists of an array of optical sensors with 244 in the vertical dimension by 320 in the horizontal dimension, all integrated on a common substrate. Each sensor element in the array has two terminals, one of which is associated with vertical selection and the other of which is associated with horizontal selection. The "vertical" terminals are interconnected in buses which extend in the horizontal dimension and which are spaced along the vertical dimension. These buses are called "rows". The horizontal terminals are interconnected in buses which extend in the vertical dimension and which are spaced along the horizontal dimension. These buses are called "columns".

The rows are selected one row at a time by a vertical enabling pulse acting in conjunction with a vertical pulse upon a two input, enable gate (also integrated). The vertical shift register, which is integrated on the common substrate, has 122 stages, each of which is coupled to a pair of enable gates. An enable pulse, which lasts for a "field" turns "on" the first input of the first gate of all the pairs of vertical enable gates. As the vertical pulse is propagated along the vertical shift register, its presence at each stage in conjunction with the enabling pulse turns on the first of each pair of vertical enable gates. When all "odd" rows have been sampled to complete one field, a second vertical enable pulse turns on the second of each pair of vertical enable gates. As the next vertical pulse is propagated down the vertical shift register, the second of each pair of vertical enable gates is turned on. The result is a selection of odd sensor rows in a first field and even rows in the second field.

Once a row has been selected at the slower vertical rate, it is swept rapidly at the faster horizontal rate. The sensor elements are arranged in the horizontal dimension in the 160 odd and 160 even "columns". The columns are selected one pair at a time by a horizontal pulse propagated along a 160 stage shift register, also integrated on the common substrate. Each stage of the horizontal shift register is coupled to a pair of horizontal enable gates (also integrated). Each horizontal enable gate controls a column of sensors, the odd gate of the pair coupling the sensor element to an odd ($e_o$) video signal output and the even gate of the pair coupling the sensor element to an even ($e_e$) video signal output. As the horizontal pulse is propatated along the horizontal register, consecutive adjacent pairs of sensor elements are "enabled", producing a simultaneous pair of odd ($e_o$) and even ($e_e$) video output signals at the respective output terminals of the array.

The scanning generator 12 operates the vertical and horizontal shift registers and the enable gates on the array. It provides rectangular vertical pulses ($V_d$) and the two vertical clocking pulses ($V_{\phi 1}$, $V_{\phi 2}$), which propagate the vertical pulses along the vertical shift register. The scanning generator also provides the vertical enable pulse for individual row selection. It also provides the horizontal pulses $H_{(d)}$ and the two phase horizontal clocking pulses ($H_{\phi 1}$ and $H_{\phi 2}$) which propagate the horizontal pulse along the horizontal shift register. In short, the scanning generator generates the timing waveforms which scan the array.

The scanning is done in a unique manner which facilitates noise reduction. The scanning generator scans the sensor array in a raster pattern modified in several significant respects.

The basic raster scan is achieved in the manner indicated above. The scanning generator acting through the vertical shift register selects a pair of rows. The first row in that pair and the following pairs is activated by the vertical enabling pulse, and the horizontal shift register steps along the two, two adjacent horizontal elements at a time. In succession, the first row of the second pair of row, i.e., row 3, which is also activated by the enabling pulse, is scanned followed in succession in each of the odd rows until the first field is completed. After the first field is completed, the vertical enabling pulse now enables the second row of the first pair of rows and the second row of all the following pairs of rows. In succession, the second, fourth and all the even rows are scanned until the second field is completed. The process of scanning the odd rows is then repeated for the third field, etc.

The first significant modification in the scanning over that of a more conventional raster scan is that the odd and even column signals are collected simultaneously on two separate output terminals. The odd column elements are coupled to the $e_o$ signal output of the imager and the even column elements are coupled to the $e_e$ signal output of the imager. These outputs are processed in parallel and then combined in a manner to produce a first reduction in random noise.

The second significant modification in the scanning process is that after each row has been read out in the conventional destructive manner it is immediately reread before a renewed image induced charge has been acquired by that row of elements. This second reading of the line is used to acquire a noise signal which may be used to cancel noise from a succeeding line in the scanned image. Double reading of a selected row is achieved by omitting alternate vertical clocking pulses in the scanning generator output.

A third modification in the scanning process over that of the conventional interlaced scanning is designed to achieve field to field noise reduction in the display. This is achieved by starting the horizontal line of each field at the start of the horizontal clocking interval, rather than at the middle of the horizontal clocking interval as in the conventional field interlace. In addition, two fields are displayed together in a mutually interlaced pattern, the full raster occupying alternate line positions on a conventional 525 line display. The implications of these modifications in the noise reduction process is a principal subject of the following discussion.

Pulse operated scanning generates objectionable "pattern" noise which accompanies the video signal and which must be reduced for satisfactory use of the imager output. The scanning process depends on the selection of sensor rows and sensor columns by a sequence of pulses. The horizontal pulse, in particular, are repeated in the register outputs at the same rate that the sensor elements are selected. They create pattern noise at each active sensor and at each active enable gate output, through stray gate to source and gate to drain capacity. At the instant of selection, the pattern noise takes the form of a short duration spike occurring at the beginning of the period assigned to each picture element and having an amplitude many times greater than the amplitude of the video signal level. The spike results from differentiation of the leading edge of the clocking pulse in these stray capacities. The video signal takes the form of a smooth dc voltage. Both pattern noise and signal are established across the capacity of the active sensor element and any additional capacity at the output of the active enable gate. The spikes stored in this capacity begin to decay immediately, and toward the end of the period allocated in each picture element, the stored voltage most closely approximates the true value of the video signal. The separation of the video signal from the pattern noise is a principal function of the circuitry following the imager.

The foregoing imager scanning represents a practical arrangement in which the shift register complexity on the array is reduced approximately in half and results in major improvements in the signal to noise ratio. The two advantages more than offset the disadvantage of some degree of parallel signal processing. The parallel processing will now be described.

The known imager parallel processing network comprises the elements 13 through 28. Elements 13, 15, 17 and 19 treat the odd column output signal ($e_o$); elements 14, 16, 18 and 20 treat the even column output signal ($e_e$); while the remaining elements 21–28 combine the two signals and then act upon them jointly.

The initial elements in each video channel are the noise cancellers 13 and 14. The noise cancellers operate on the principle that the imager output waveform contains a large amount of polarized pattern noise at the horizontal clocking frequency. The imager output signals $e_o$ and $e_e$ are coupled to a first signal input of the noise cancellers 13 and 14, respectively. A sample of the horizontal clocking pulse is coupled to a second input of each canceller. The sample is selectably in reference phase ($H_{\phi 1}$) or out of reference phase ($H_{\phi 2}$) and of a magnitude which is adjustable by the potentiometer indicated within each block. The adjustments are designed to add pattern noise directly to the video signals in proper phase and amount for maximum noise cancellation. Since the pattern noise varies from element to element in a given row of sensors, but is largely identical from row to row, being primarily a property of array capacities in the horizontal enable gates, the setting of the canceller is fixed at a setting which compensates for the average level of pattern noise. This setting leaves the pattern noise only partially compensated in the typical sensor element but produces a very general improvement in the signal to noise level of the total signal.

The output of the noise cancellers 13 and 14 is applied to the preamplifiers 15 and 16. The canceller output waveform is the first waveform illustrated in FIG. 2. Even after cancellation, the waveform may be seen to contain a succession of relatively short duration, high amplitude peaks at the beginning of the horizontal element which decays to a dc level towards the end of the horizontal element, representing the video signal level with some noise superimposed. At this point in the system, the pattern noise may be 10 to 20 times as large as the desired video component. The preamplifiers 15 and 16 amplify the separate ($e_o$ and $e_e$) signals and apply them to the low pass filters 17 and 18.

The low pass filters 17 and 18 have a roll off set at the horizontal element frequency (typically 1.5 megahertz) and have a null at double that frequency. The roll off reduces the higher harmonics in the pattern noise spikes. The null is particularly useful in reducing heterodyne noise generated in the sampling process which operates at twice the clock frequency. In the absence of "nulling", this noise would be converted to "base band" and would lie in the lower portion of the desired video spectrum. The filters produce an improvement on the order of 10 to 20 db in the signal to noise ratio in the video signal. This is the second waveform illustrated in FIG. 2.

The sample and hold circuits 19 and 20 are designed to sample the signal at the last practical moment before the next horizontal pulse. The sampling pulse for these circuits is the third waveform shown in FIG. 2, and it is derived from the scanning generator. The output of the sample and hold networks is the fourth waveform shown in FIG. 2. Assuming that a white bar is being imaged throughout the illustrated portion of the image, the dc video level has an average amplitude of 10 units (for example) while the element to element fluctuation due to pattern noise has now been reduced to approximately 1 comparable unit. At the output of the sample and hold network the signal is usable, but the signal to noise ratio is well below an ideal value.

The remaining elements (21–28) in the parallel processing network enter into the process of combining the odd ($e_o$) and even ($e_e$) imager outputs. They combine the signals in such a way as to retain the high frequency information in the separate $e_o$ and $e_e$ channels and at the same time achieve a 3 db improvement in the random noise. The buffer amplifier 21 at the end of the $e_o$ channel couples its output to the adder 24. The buffer amplifier 22 in the $e_e$ channel is followed by a delay element 23 designed to delay the signal by one horizontal element. The output of delay element 23 is coupled to the other input of the adder 24. A combined output of the $e_o$ and $e_e$ channels appears at the "positive" input to the differential amplifier 28.

The combining process performed in the adder 24 blurs transitions, and in effect attentuates the higher frequency information in the video signal. This "blurring" may be explained as follows. Let us assume that a transition or picture edge, for instance going from black to white, occurs at some element in the array. The odd channel signal $e_o$ produces a step between a pair of array sensors at this transition. Similarly, the even channel signal $e_e$ produces a step. Because of the delay in the delay element 23, the even channel signal shows the same step delayed one horizontal element. The result is a sloping, two step transition as opposed to a steep, single step transition. It is evident that the two steps can not be coincident because of the delay of one signal in relation to the other. The same effect is present when the reverse transient occurs.

An analysis of the waveshapes of the transition shows that if a pulse representing the difference between $e_o$ and $e_e$ delayed is added in proper polarity to the summed signal, that the steepness of both transitions can be restored and the "blurring" eliminated. This is achieved by the elements 25, 26 and 28. (The noise clipper 27 is present in the network, but not relevant to this process.) The differential amplifier 25, which is coupled to the outputs of the $e_o$ and $e_e$ channel buffers, produces a pulse which is equal to the signal difference at the transition. The difference pulse is coupled to a controlled phase inverter 26, whose phase is controlled by the switching waveform ($e_{sw}$) at twice the horizontal element rate (on the array). If the edge of the transition occurs between unpaired line elements in the row, the phase inverter produces an inverted signal. If the edge of the transition occurs between paired line elements in a row, the phase inverter produces a non-inverted output. The correction pulse is applied to a noise clipper 27, which is set to reduce base line noise. After clipping, the correction pulse is subtracted at the differential amplifier 28 from the ($e_o + e_{e\,d}$) signal.

The result of the double combination of the odd and delayed even signals, in which both sum and differences are used, as to preserve the full video spectrum without high frequency attenuation. The second result of the combination of the $e_o$ and $e_e$ signals is to produce a signal of approximately twice the initial signal level, while the randon noise, which is non-coherent, adds in quadrature. The arrangement produces a 3 db improvement in signal to noise ratio.

The novel pattern noise suppression circuitry operates upon the consolidated signal. It consists of the blocks 29 to 39. The operation of these blocks will be explained with reference to the waveforms of FIG. 3. The circuit details of a practical embodiment of the invertion are illustrated in FIG. 4.

The initial block in the novel pattern noise suppression circuitry is the 1 horizontal line delay 29. At the input of the delay block 29, the video signal takes the form illustrated in the first waveform in FIG. 3, and denominated "e". Four horizontal line positions are depicted in that waveform. The four horizontal line positions correspond respectively to the first line of the charge sensor, the emptied first line reread, the third line, and the emptied third line reread. All are derived from the same odd row field. The line in the first position to the left commences with a blanking pulse, goes to a black level, and then rises to a white level for perhaps 1/6th of the line and returns to black for the balance of the line. This illustrates the video waveform of a white bar. Superimposed on the video waveform at the first horizontal line position is pattern noise illustrated by a pair of upwardly pointing arrows of arbitrary magnitude, intended to illustrate the observed polarization of the pattern noise. The second horizontal line position contains an initial blanking pulse, a uniformly black video level denoting the absence of a video signal and upon which a second pair of upwardly pointing arrows depicting pattern noise are superimposed. The third horizontal line position has the video signal with pattern noise, while the fourth line position has no video and does have pattern noise. As previously explained, a zero video output on the even horizontal line positions (in the illustrated manner) is achieved by immediately scanning the same row on the CID imager a second time. The second scan must occur after the row has been destructively read out and before the row of sensors has had an opportunity to acquire fresh image charges. While the initial "e" waveform shows only four consecutive lines of waveform, the same alteration between video and no video, with appreciable upwardly polarized pattern noise continues for 122 lines in the odd field and 122 lines in the even field.

The one line delay block 29 delays the $e$ waveform by 1 line interval. The delayed waveform, which appears at the output of block 29, is shown in the second waveform ($e_d$) of FIG. 3. In the $e_{(d)}$ waveform it may be seen that the initial line position in FIG. 1 is empty but that the second line position now has video information with upwardly polarized pattern noise. The third line position of the delayed waveform has no video information but has upwardly polarized pattern noise, and the fourth line position has video information and upwardly polarized pattern noise, and so forth. The second line position now contains the first line of the image sensor; the third line position contains the emptied first line reread; and the fourth line position contains the third line of the image sensor. The sequence continues as before through the odd and even fields.

Figure 4:
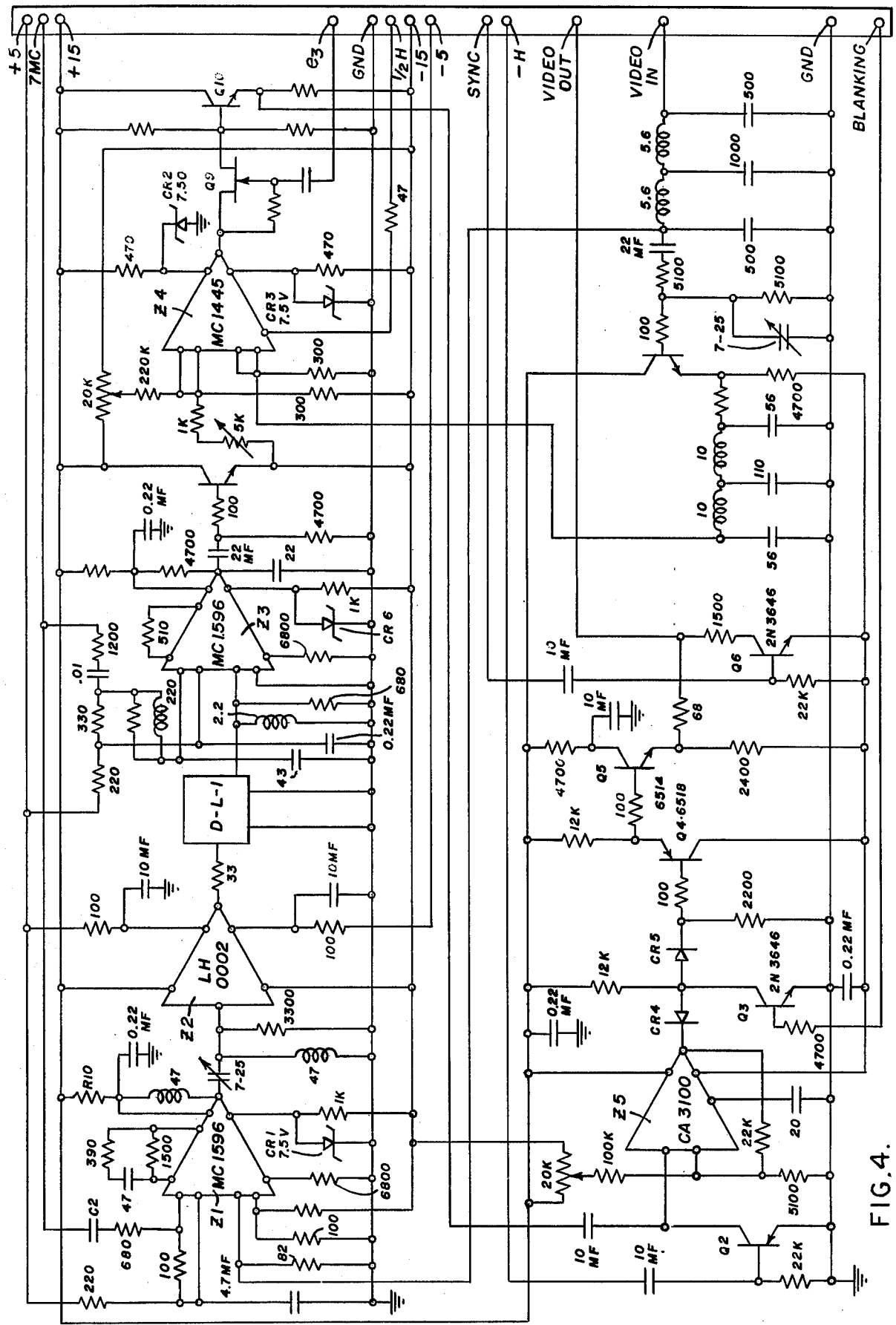
FIG. 4 is an electrical circuit diagram of the portions of the FIG. 1 imaging system which produce line to line electrical and field to field visual pattern noise cancellation.

The circuit means by which the line delay is achieved is illustrated in detail in FIG. 4. The delay element itself is a quartz delay line (DL-1). Since the delay line is operated at 7 megahertz, the video signal is AM modulated on a 7 MHz carrier. AM modulation on the carrier is performed in the integrated circuit Z1. The modulated carrier is then filtered to pass the requisite side bands and applied to a buffer amplifier Z2 before application to the delay line. After passage through the delay line, the video signal is recovered by synchronous detector Z3. The synchronous detector is followed by the buffer transistor stage $Q_1$.

The differential amplifier 30 substracts the delayed video signal from the undelayed signal. The differential amplifier is a portion of a conventional integrated circuit (Z4, FIG. 4). One input of the differential amplifier is coupled to the output of the buffer $Q_1$ at which the delayed video signal is available, and the other input is coupled to the undelayed video input line. In FIG. 4, the undelayed video input is coupled via the emitter follower $Q_8$ to the differential amplifier input.

The subtraction performed in differential amplifier 30 is illustrated in the third waveform ($e - e_d$) of FIG. 3. In the first line position, the subtracted waveform repeats the first line of the original video waveform ($e$), with upwardly polarized pattern noise at full intensity. In the second line position, the video signal (which repeats the video information of the first line) is now of inverted signal polarity and contains a small residue of polarized pattern arbitrarily shown as upwardly extending. On the third line position, the video signal corresponding to the third line of the sensor is of uninverted polarity, and contains a small residue of upwardly polarized pattern noise. On the fourth line position, the video signal of the third line is inverted, and contains a small residue of upwardly polarized pattern noise. The subtracted waveform continues through the 122 odd lines of the odd field and the 122 even lines of the even field.

Several properties of the subtracted ($e - e_d$) waveform are significant. The polarity of the video signal alternates from odd line position to even line position. After the first line, the pattern noise is reduced to a "residue", which retains a common polarity from line to line. This does not imply that each element of pattern noise is of one polarity, but rather that the line pattern noise as a whole is polarized. As will be hereinafter explained, it is possible to oppose these pattern noise residues to effect further cancellation of the pattern noise.

The switching inverter, block 31, follows the differential amplifier and generates a video signal in which the video in even line positions is erected, so that all lines are of like polarity. At the same time, the pattern noise residues are polarized upwardly in odd line positions and downwardly in even line positions.

The switching inverter 31 may be regarded as consisting of three "equivalent" elements, as illustrated in FIG. 1: an inverter 32, a single pole, double throw switch 33, and switch control means 34 operated at half the horizontal line rate (H/2). One stationary contact of the switch 33 is coupled to the input of the inverter 32 and the other stationary contact is coupled to the output of the inverter 32. The pole of the switch, at which output of the switching inverter is derived, is switchable at half the line rate (H/2) under the control of the control means 34 between the two stationary contacts. The control means 34 is synchronized with the video signal so that the first line of the difference waveform is obtained directly from the difference amplifier 30 without inversion. During the second line, the video signal occurring at the second line position is obtained via the inverter 32, which reinverts the line to the erect polarity. In the third line position the switch 31 selects the uninverted waveform, and in the fourth line position, the switch selects the inverted waveform.

The actual circuit of the switching inverter 31 is shown in FIG. 4. The switching inverter is a portion of an integrated circuit (Z4), which includes a pair of differential amplifiers and an electrically controlled gate for selecting the output of one of the two differential amplifiers. The delayed video signal is coupled to the positive terminal of one differential amplifier and to the negative terminal of the other differential amplifier. The undelayed video signal is coupled to the negative terminal of the "one" differential amplifier and to the positive terminal of the "other" differential amplifier. In this manner, an uninverted difference signal is available at the output of one difference amplifier, and an inverted difference signal is available at the output of the other difference amplifier. The electrically controlled gate is controlled by the H/2 waveform to select the output of either the first or the second differential amlifiers.

The waveform at the output of the switching inverter 31 is denoted $e_{sw}(e - e_d)$ in FIG. 3. While each line of video information is of the same polarity, the polarity of the pattern noise residue alternates from line to line. In particular, the noise residue at the first line position is polarized upwardly, while the noise residue at the second line position is polarized downwardly. In short, the switched video output $e_{sw}(e - e_d)$ contains a raster in which each line of video information is repeated a second time. The video in each line position is of proper polarity, and the pattern noise, which is repeated from line to line, is polarized upwardly in the odd line positions and downwardly in the even line positions. As will now be shown, further pattern noise cancellation may be achieved by using the video in the "odd" line positions to form a first field in a visual display and the video in the "even" line positions to form a second field. Since the pattern noise is inverted from field to field, further visual cancellation may be achieved.

Field to field visual pattern noise cancellation is accomplished in the remaining blocks 35, 38 and 39. The line rate field switch 35, which is coupled to the output of the switching inverter, is the initial block. Its output is coupled to the video processor 38, in which blanking and synchronizing pulses are added and in which clipping takes place. The output from the video processor 38 is then coupled to the monitor 39.

The line rate field switch 35 selects the video from the odd line positions for the odd fields and the video from the even line positions (of FIG. 3) for the even fields for eventual display. The line rate field switch may be schematically represented (as in FIG. 1) as consisting of an electrically controlled single pole-single throw switch 36, controlled by the control means 37. When the switch 36 is in the open position, the video waveform is interrupted in its passage to the output circuitry. When the switch 36 is in the closed position, the video waveform passes to the output circuitry. The line rate field switch is turned on for a period or off for a period dependent on the control voltage applied to the control means 37. The control waveform for the control means 37 is shown at $e_3$ in FIG. 3 for the odd and even fields. The $e_3$ waveform consists of a series of pulses synchronized with the line positions of FIG. 3 for providing an "on" switch condition for a line duration followed by an "off" switch condition for a line duration. The "on" condition is achieved by a plus voltage condition and the "off" condition is achieved by a zero voltage condition. For the first field, using odd imager lines, the $e_3$ waveform of FIG. 3 for field 1 is applied in the control means 37. This turns on the switch 36 during the first, third and following odd line positions to the output circuitry. The output waveform for the odd line field is illustrated at $e_o$ (field 1). During the second field from the imager, using even imager lines, the $e_3$ waveform for the field 2 is applied to the control means 37. This turns on the switch 36 during the second, fourth and following even line positions of the $e_{sw}(e - e_d)$ waveform, and couples the video in the corresponding even line positions to the output circuitry. The output waveform for the even line field is illustrated at $e_o$ (field 2). It may be seen that the video information is erect in the fields while the pattern noise in field 1 is polarized oppositely to that in field 2, and thus alternates between odd and even fields.

The actual circuit of the line rate field switch 35 is shown in FIG. 4. It consists of an FET transistor Q9 and a bipolar transistor Q10. The FET transistor Q9, to which the $e_3$ waveform is applied, acts as both switch 36 and as control means 37. The transistor Q10 is an emitter follower buffer for coupling the sampled video to the video processor 38.

Figure 5:
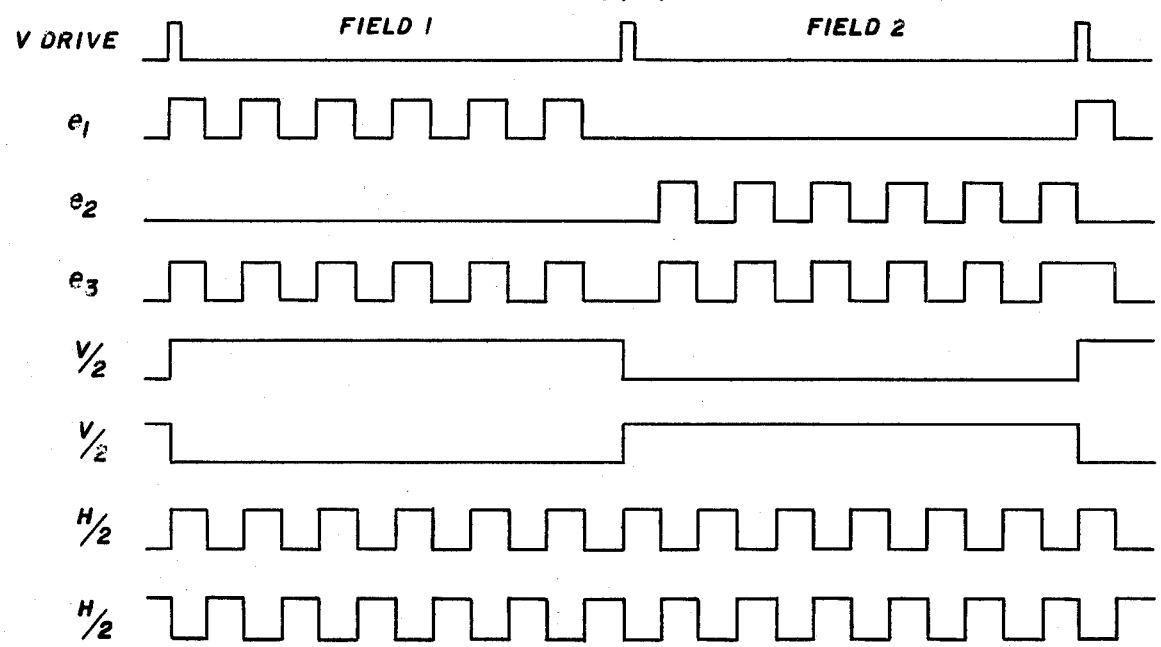
FIG. 5 illustrates the waveforms relevant to field to field visual pattern noise cancellation, graphed at the field rate.

The $e_3$ control waveform for the line rate field switch 35 is generated by the elements 40 to 44 of FIG. 1, forming the control waveform generator. The relevant waveforms are illustrated in FIG. 5. The time scale of the FIG. 5 waveforms are greatly compressed in relation to those in FIG. 3, and somewhat simplified. In FIG. 5, the illustrated period is that occupied by two fields (as opposed to four lines in FIG. 3), and each field is represented as being composed of a few lines (6 in the illustration), whereas each field may have 122 lines in a practical case.

The vertical drive waveform ($V_{drive}$) is shown in FIG. 5. It consists of a short duration pulse at the beginning of each field. That waveform is available in the scanning generator 12. It is used to produce the V/2 and $\overline{V/2}$ waveforms illustrated in FIG. 5 and used as inputs to the control waveform generator. The V/2 waveform is the inverse of the $\overline{V/2}$ waveform and consists of an "on" voltage during odd fields and an "off" voltage during even fields. The V/2, $\overline{V/2}$ waveforms are at half the frequency of the vertical drive waveform. The other input waveforms to the control waveform generator are the H/2 and $\overline{H/2}$ waveforms of FIG. 5. The H/2 waveform is the inverse of the $\overline{H/2}$ waveform and consists of an "on" voltage during odd lines (in both fields) and an "off" voltage during even lines (in both fields). The H/2, $\overline{H/2}$ waveforms are at half the frequency of the horizontal waveform.

The control waveform generator generates the output waveforms $e_3$ (field 1) and $e_3$ (field 2) of FIG. 5 by application of the V/2, $\overline{V/2}$ and H/2, $\overline{H/2}$ thereto. As noted above, the control waveform generator includes the elements 40 to 44. These elements include a pair of AND gates 42, 43 and a pair of inverters 40 and 41, and an OR gate 44. The H/2 and V/2 are applied to the AND gate 42 to obtain the $e_1$ waveform of FIG. 5. The $e_1$ waveform consists of a succession of pulses of horizontal line duration which are "on" for the odd lines for field 1. For field 2, the $e_1$ waveform is off (zero volts). The H/2 and V/2 waveforms are applied to the inverters 40 and 41, respectively, to obtain the inverse functions $\overline{H/2}$ and $\overline{V/2}$. The inverse waveforms are then applied to the inputs of the second AND gate 43 to produce the $e_2$ waveform of FIG. 5. The $e_2$ waveform consists of a succession of pulses of horizontal line duration, which are on for the even lines for field 2. For field 1 the $e_2$ waveform is off (zero volts). The $e_1$ and $e_2$ outputs of the AND gates 42 and 43 are then "OR'd" by the OR gate 44 to obtain the control waveform $e_3$ of FIG. 5. the $e_3$ control waveform consists of a series of "on" pulses for odd lines in field 1 and "on" pulses for even lines in field 2, required for operation of the line rate field switch 35.

The line rate field switch 35 thus produces a video output for the first field in which the odd line video information is shown at $e_o$ (field 1) with the pattern noise residues upwardly polarized. The second field contains even line video information as shown at $e_o$ (field 2) with downwardly polarized pattern noise residues.

The $e_o$ signal from the line rate field switch 35 is now applied to the video processor, block 38, in which system blanking, clipping and synchronizing signals from generator 45 are applied to the video signal. The sync generator 45 is modified to facilitate appropriate treatment of the two video fields. In particular, the generator 45 is modified to start the first line of each field at the beginning, as opposed to starting the even fields at the half line for interlace. Thus, the generator operates at a count of 262 per field as opposed to 262½ per field for normal interlace. When the odd field is being applied to the monitor 39, the odd sensor lines are supplied to every fourth line of a conventional 525 line display until the 122 lines for that field have been displayed. The blanked lines of $e_o$ (field 1) waveform are not displayed. When the even field is being applied to the monitor 39, the even sensor lines are supplied intitially to line 3 of the 525 line display, and so on for every fourth line until the 122 lines for that field have been displayed. The blanked lines for the $e_o$ (field 2) waveform are not displayed.

The result of combining the two 122 line fields is that the display has a total of 244 lines, at approximately double the usual spacing between lines, and corresponding to the positions occupied by the odd field in a conventional 525 line display. The odd field lines thus alternate on the display with the even field lines to form a compound raster of half the vertical line resolution of the conventional 525 line display. The odd field lines contain pattern noise of upward polarity, while the alternate even field lines contain pattern noise of downward polarity. When the two fields are viewed concurrently, the eye integrates the pattern noise between the successive fields, even though viewed on adjacent lines, and produces a very significant visual cancellation of the pattern noise.

The actual circuitry for the video processor is shown in FIG. 4. Video amplification of the sampled video waveform is performed by the integrated circuit Z5, the blanking waveform being added via $Q_3$, and the synchronizing waveform being introduced via Q6. The video output, which is now in a suitable form for display on a conventional TV monitor, is available at the output of the emitter follower $Q_5$.

what is claimed as new and desired to be secured by Letters Patent of the United States is:

1. In combination:
   A. a solid state imager, in which pattern noise is present in the video output in the form of a succession of variable amplitude pulses, one per light sensing element in each row and duplicated from row to row, said imager generating a video signal in which a row storing video information is read out destructively at a given horizontal line rate followed by read out of the same row at said given horizontal line rate before video information has been reestablished to form a first video signal in which each line of video information containing pattern noise is followed by a line containing no video and repeating the pattern noise, said process being repeated for each of a plurality of rows,
   B. delay means coupled to said imager for delaying said first video signal by one horizontal line interval, and
   C. means to combine said undelayed and delayed first video signals in opposite polarities to form a second video signal in which the video information occurs in a line pair, the video information of the first line of the pair being repeated in opposite polarity in the second line, and the pattern noise being reduced by cancellation to a small residue of like polarity in both lines of each line pair, after the first.

2. The combination set forth in claim 1 wherein
   A. the odd sensor rows are read out in consecutive order to form a first field, and the even sensor rows are read out in consecutive order to form a second field, and having in addition thereto:

B. switching means to which said second video signal is applied for inverting one line of each line pair to form a third video signal in which the pattern noise residue of said first line is of opposite polarity to that of said second line while the video information is of like polarity, and C. switching means to select the first members of each line pair from one sensor field in consecutive order for a first display field and the second members of each line pair from the second sensor field in consecutive order for a second display field to provide a fourth video signal in which the polarity of the pattern noise residue in the first display field opposes that in the second display field for visual cancellation.

3. The combination set forth in claim 2 wherein a synchronizing pulse generator is provided for adding horizontal synchronizing pulses to said fourth video signal to facilitate display of an integral number of lines per field with the odd sensor lines being displayed in alternation with and equally spaced between the even sensor lines.

4. The combination set forth in claim 3 wherein said synchronizing pulse generator produces horizontal pulses twice per line pair, said pulses starting at the beginning of the line in both odd and even sensor fields for causing a display monitor to sweep once with a video signal and once without a video signal respectively per line pair for one field, and once without a video signal and once with a video signal respectively per line pair for the alternate field.

* * * * *